UNITED STATES PATENT OFFICE.

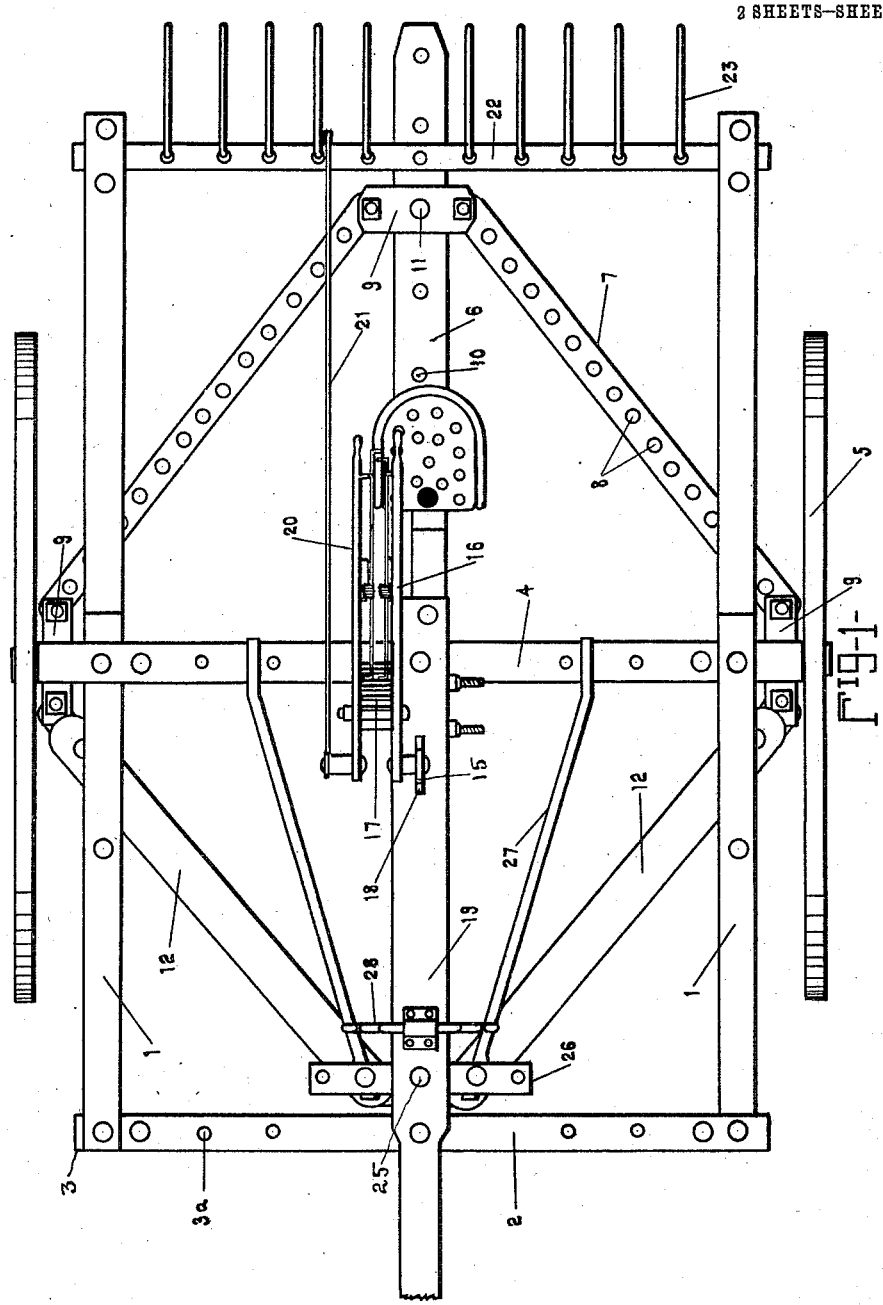

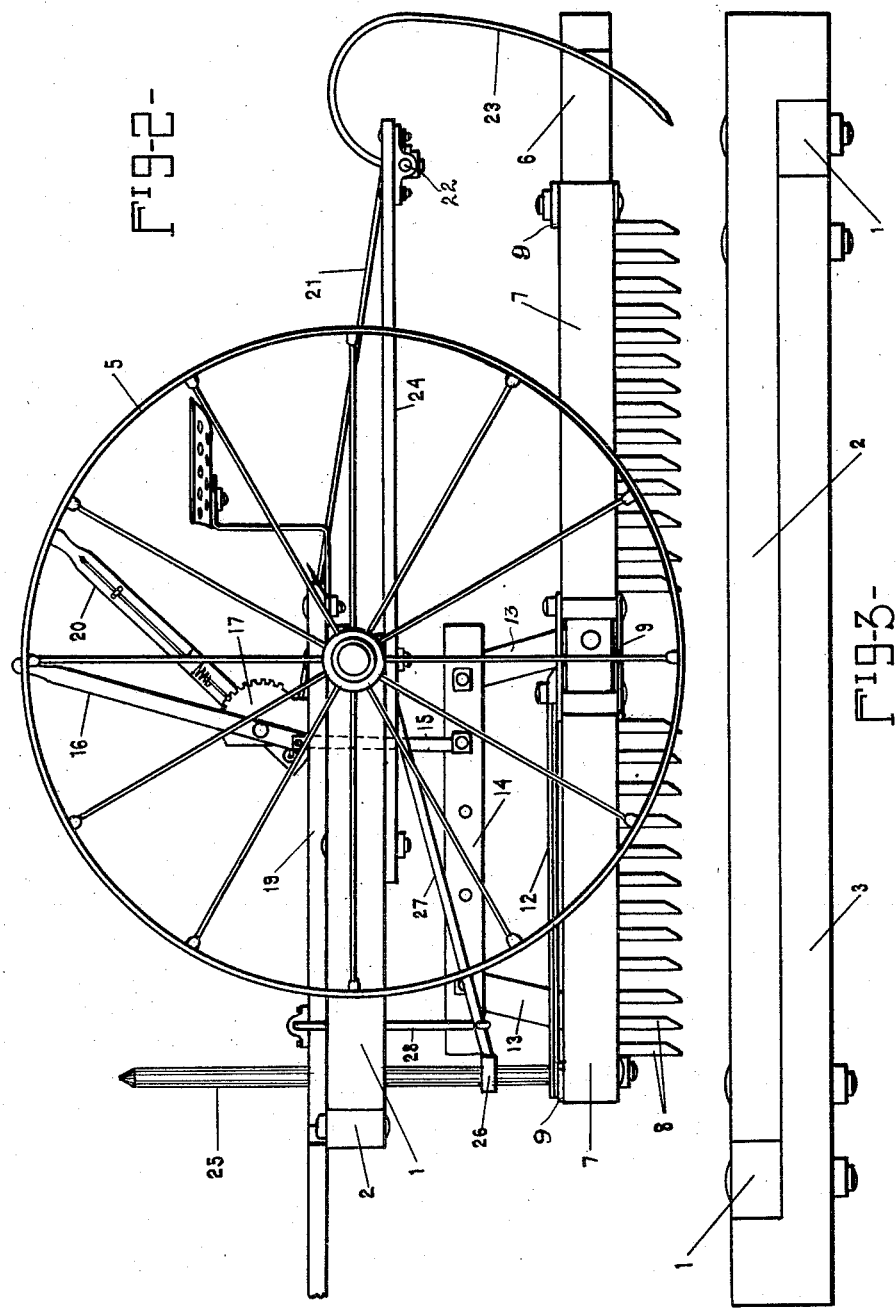

HARVEY P. HARRIS, OF FERRIS, TEXAS.

COMBINED STALK-CUTTER AND HARROW.

1,005,830.   Specification of Letters Patent.   Patented Oct. 17, 1911.

Application filed November 18, 1909. Serial No. 528,668.

*To all whom it may concern:*

Be it known that I, HARVEY P. HARRIS, a citizen of the United States, residing at Ferris, in the county of Ellis and State of Texas, have invented certain new and useful Improvements in Combined Stalk-Cutters and Harrows, of which the following is a specification.

My invention relates to new and useful improvement in combined stalk cutters and adjustable harrows. Its object is to provide a wheeled farm implement, which may be used either as a stalk cutter or as a harrow, or which may be made to fill both these functions simultaneously.

Another object is to provide means by which the width of the harrow may be adjusted so as to adapt the implement to cover small or large surface as required.

A further object is to provide the described implement with a pivoted rake at its rear extremity, which will serve to gather the stalks in windrows as they are cut.

A still further object is to provide means by which the rake and harrow may be separately raised, making them inoperative.

Finally the object of this invention is to provide a device of the character described, that will be strong, durable, simple and efficient and comparatively easy to produce, and also one in which the various parts will not be likely to get out of working order.

With these and various other objects in view, my invention has relation to certain novel features of construction and operation, an example of which is described in the following specification and illustrated in the accompanying drawing, wherein:

Figure 1 is a top view of the complete machine. Fig. 2 is a side elevation of the same. Fig. 3 is a detail view of a two part cross piece of the frame, showing the construction by which said beam is made extensible.

Referring now more particularly to the drawings, wherein like numerals of reference designate similar parts in all the figures, the numeral 1 denotes the side beams of the frame. The forward extremities of these beams are connected by a two part cross piece composed of an upper part 2 and a lower part 3. A plurality of bolt holes 3ᵃ is provided in this two part beam to permit adjustment of its length by sliding the two beams upon each other. The axle 4 upon which are mounted ground wheels 5, is similarly constructed of two parts so that it may be extended.

Beneath the main frame of the machine is mounted a vertically adjustable frame consisting of a longitudinal center beam 6, and four horizontally adjustable bars 7. These bars are provided with harrow teeth 8, and have their extremities connected by pairs of plates 9 in such a manner as to form a pantograph. The front and rear pairs of plates 9 are mounted upon the beam 6, and the rear pair of plates is adapted to slide longitudinally upon said beam. When these plates are adjusted to their rearmost position, the bars 7 lie contiguously beneath the tongue, adapting the harrow to cut only one or two rows. When it is desired to cut the maximum number of rows with the harrow, the rear plates 9 will be slid forward upon the beam 6 until they are in transverse alinement with the lateral plates. As the width of the harrow is increased, the width of the frame is also increased by extending the forward beam shaft 22 and the axle. A plurality of holes 10 is provided in the beam 6 to receive the bolt 11, which holds the rear plates 9 adjusted in their various positions.

Upon the two forward beams 7 are rigidly mounted knives 12 which act as stalk cutters. These knives are removable so that it is possible to use the harrow separately if so desired.

A pair of arms 13, extending upwardly from the beam 6 are surmounted by a horizontal beam 14. To this beam is pivoted a rod 15, the upper extremity of which is pivoted to the lower extremity of a lever 16 mounted upon a toothed standard 17. The rod 15 passes through a slot 18 in the tongue 19 of the vehicle. By manipulating the lever 15, the suspended frame 6 may be raised or lowered as desired. Upon the toothed standard 17 is also mounted a lever 20, from the lower extremity of which there extends a rod 21 to a rocker shaft 22 at the rear of the machine, upon which shaft are mounted the rake teeth 23. The said shaft 22 may be of any desired length to fit the lateral adjustment of the frame. Obviously the stalks cut by the knives 12 will be gathered up by the rake teeth 23, and carried along until the said teeth are raised by manipulating the lever 20.

To guide the suspended frame during its vertical adjustment, a rod 25 is extended vertically from the front of said frame passing through the tongue 19.

The numeral 26 denotes the double tree through whose center the rod 25 also passes. Side braces 27 extend from the double-tree to the axle, said braces being reinforced by a brace 28 secured to the tongue.

It will be seen that the described device provides upon one wheeled frame the equivalent of three implements which are ordinarily mounted upon separate wheeled frames. A considerable economy is thus accomplished. The device will also save time by cutting the stalks and raking them simultaneously.

I am aware that changes may be made in the form and proportion of parts and details of construction of the device herein described as a preferable embodiment of my invention, without departing from the spirit or sacrificing the advantage thereof, and I therefore reserve the right to make such changes and alterations in said device as fairly come within the scope of the following claims.

What I claim is:

1. In a combination implement of the class described, the combination with a laterally adjustable frame, an adjustable axle mounted upon the frame and supporting wheels therefor; of a supplementary frame mounted beneath the main frame, said frame second mentioned being laterally adjustable and implements mounted upon the main and supplementary frames, whereby the same may be adjusted to operate upon a predetermined section of ground.

2. A device of the character described, comprising the combination with a main supporting frame, said frame being adjustable in width, a tongue carried by the frame, an adjustable axle carried by the frame, supporting wheels therefor, a supplementary frame beneath the main frame and comprising four bars pivotally secured together, the rear portion of the supplementary frame being adjustable, implements carried by the supplementary frame and the rear portion of the main frame, independent means for adjusting said implements vertically and laterally and a guide for the supplementary frame.

In testimony whereof I have signed my name to this specification in the presence of two subscribing witnesses.

HARVEY P. HARRIS.

Witnesses:
J. E. HARVILLE,
C. C. BATCHLER.

---

Copies of this patent may be obtained for five cents each, by addressing the "Commissioner of Patents, Washington, D. C."